US006674431B1

(12) United States Patent
Enomoto et al.

(10) Patent No.: US 6,674,431 B1
(45) Date of Patent: Jan. 6, 2004

(54) METHOD FOR PROCESSING DATA EXPRESSING THREE-DIMENSIONAL SHAPE

(75) Inventors: Yasumi Enomoto, Takatsuki (JP); Koichi Fujihara, Otsu (JP)

(73) Assignee: Minolta Co., Ltd., Osaka (JP)

( * ) Notice: Subject to any disclaimer, the term of this patent is extended or adjusted under 35 U.S.C. 154(b) by 393 days.

(21) Appl. No.: 09/580,118

(22) Filed: May 30, 2000

(30) Foreign Application Priority Data

May 28, 1999 (JP) .......................................... 11-149053

(51) Int. Cl.[7] .............................................. G06T 17/00
(52) U.S. Cl. ........................ 345/419; 345/420; 345/958
(58) Field of Search ................................ 345/419–421, 345/423, 427, 473, 474, 581, 606, 607, 958; 382/154, 203, 276, 285, 293, 294; 356/607, 608, 611, 640; 359/18, 213; 707/3; 700/86, 182, 255

(56) References Cited

U.S. PATENT DOCUMENTS 4,982,438 A * 1/1991 Usami et al. ................. 382/25
5,347,363 A * 9/1994 Yamanaka ................... 356/376
5,475,422 A * 12/1995 Mori et al. ..................... 348/48
5,668,631 A 9/1997 Norita et al.
5,990,895 A 11/1999 Fujii et al.
6,263,100 B1 * 7/2001 Oshino et al. ............... 382/154

OTHER PUBLICATIONS

Three–dimensional vision, Apr. 20, 1998, 6 pps.

* cited by examiner

Primary Examiner—Almis R. Jankus
(74) Attorney, Agent, or Firm—Burns, Doane, Swecker & Mathis, LLP

(57) ABSTRACT

A method for mutually mapping first three-dimensional data C1 and second three-dimensional shape or a two-dimensional image by specifying a plurality of correspondence points RP, wherein the first three-dimensional data C1 are displayed on a display screen and a contour line TU designating the height in the depth direction is displayed within the first three-dimensional data C1, and the contour line TU is used as a guide marker of the position of the correspondence points RP in the depth direction.

20 Claims, 12 Drawing Sheets

C1 (Q)

METHOD FOR PROCESSING DATA EXPRESSING THREE-DIMENSIONAL SHAPE

This application is based on Patent Application No. HEI 11-149053 filed in Japan, the content of which is hereby incorporated by reference.

BACKGROUND OF THE INVENTION

1. Field of the Invention

The present invention relates to a method for processing data expressing a three-dimensional shape.

The present invention further relates to a method for mutually mapping data expressing a three-dimensional shape and data expressing another three-dimensional shape, or data expressing a three-dimensional shape and data expressing a two-dimensional shape.

2. Description of the Related Art

Conventionally, modeling by so-called model base in which a three-dimensional model prepared beforehand is modified to match data expressing a three-dimensional shape captured from a data input device, and substituting a two-dimensional image associated with a three-dimensional shape with another two-dimensional image are performed.

In these instances, three-dimensional shape data (three-dimensional shape) must be mapped to other three-dimensional shape data or a two-dimensional image. A plurality of pairs of correspondence points are specified between the data sets or images so as to map the data sets or images.

For example, U.S. patent application Ser. No. 08/665,623 which has been patented as U.S. Pat. No. 5,990,895 discloses a method of mapping easily understood by the user by specifying correspondence points on a two-dimensional image associated with a three-dimensional shape.

When correspondence points are specified, it is desirable to have a uniform distribution of the correspondence points in three-dimensional space. Conventionally, although proposals to simplify mapping, and proposals to reduce errors in the output result by specifying multiple correspondence points have been realized, proposals to distribute the correspondence points uniformly has not been realized, yet.

Therefore, there is a possibility that the correspondence points may be biased in part of the three-dimensional space. When there is a local bias of correspondence points, the errors in the output data become large.

Furthermore, when specifying correspondence points by displaying a three-dimensional shape or a two-dimensional image on a common display surface, a suitable practiced skill is required to specify ideal correspondence points because the difference in depth of the three-dimensional shape is difficult to perceive as the user attempts to specify the correspondence points uniformly.

SUMMARY OF THE INVENTION

In view of the previously described disadvantages, an object of the present invention is to allow correspondence points of two shapes to be easily specified to achieve uniformity when mapping a three-dimensional shape.

One aspect of the present invention is a method for mutually mapping a first three-dimensional shape and a second three-dimensional shape or a two-dimensional image by specifying a plurality of correspondence points in which the first three-dimensional shape is displayed on a display surface and indicators relating to the depth direction of the shape is displayed within the first three-dimensional shape, so that the indicators are to be used as guide markers of the positions of the correspondence points along a depth direction.

Another aspect of the present invention is a method for displaying a first two-dimensional image mapped to a first three-dimensional shape on a display surface, and displaying indicators relating to the depth direction of the first three-dimensional shape within the first two-dimensional image, and using the indicators as guide markers of the positions of the depth direction correspondence points.

In each of the aforesaid methods, each area between the indicators is displayed via mutually different display methods.

Still another aspect of the present invention is a method for displaying a first three-dimensional shape on a display surface and, when correspondence points have been specified in the first three-dimensional shape, determining the distance between those correspondence points and previously specified correspondence points, and issuing a warning when the determined distance is less than a predetermined value.

A further aspect of the present invention is a method for displaying a first three-dimensional shape and, when correspondence points have been specified in the first three-dimensional shape, displaying semitransparent spheres of fixed radius as the center of those correspondence points, and using these spheres as guide markers of the density of the correspondence points.

In this way, a user can simply specify uniform correspondence points within a three-dimensional space by displaying small area divisions based on the distance of the three-dimensional shape data in the depth direction. Furthermore, spheres displayed by a new specification are not mixed with previous spheres by displaying semitransparent spheres of fixed radius, and may be used as guide markers when specifying correspondence points.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
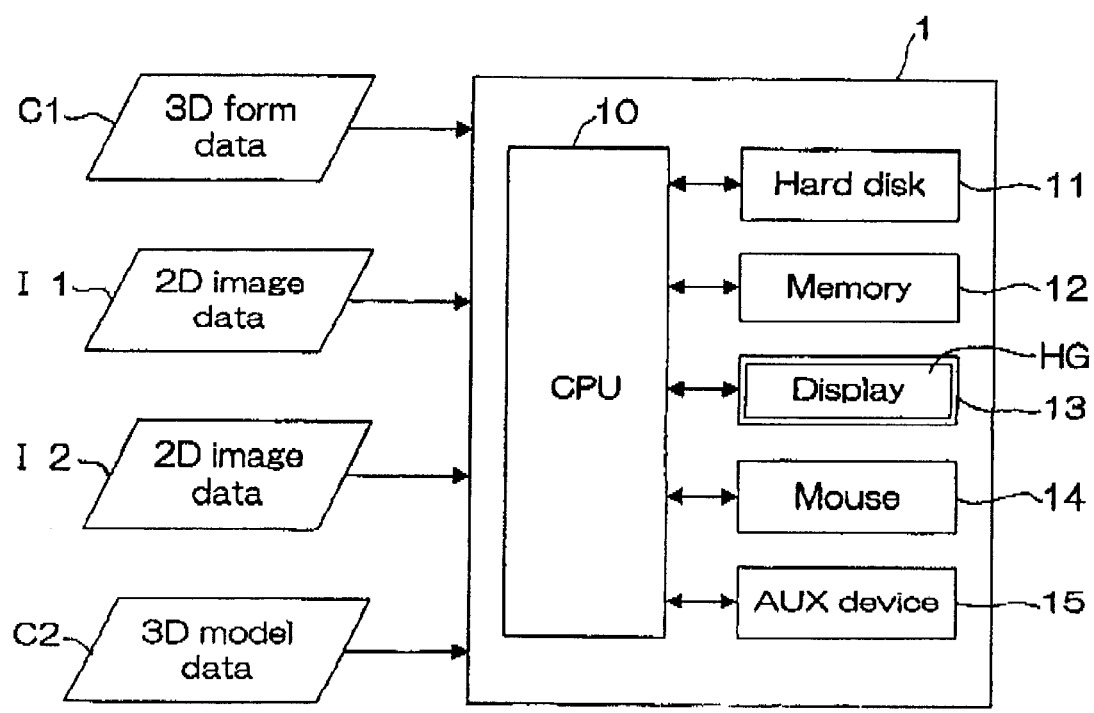
FIG. 1 is a block diagram showing the structure of the three-dimensional data processor for executing each embodiment of the present invention.

FIG. 1 is a block diagram showing the structure of a three-dimensional data processor.

The three-dimensional data processor 1 comprises a processor 10 including a CPU for executing calculation processes, hard disk 11 for storing data and programs for prosecuting the data processing of the embodiment described later, memory 12 for temporarily storing data for calculations, display 13 for displaying input data and calculation results, mouse 14 used for input to specify positions on the display surface HG of the display 13, and other peripherals or auxiliary devices 15. The three-dimensional data processor 1 may be realized, for example, by a personal computer or work station.

Three-dimensional data (three-dimensional shape data) C1, two-dimensional image (two-dimensional image data) I1 related to the three-dimensional data C1, three-dimensional data (three-dimensional model data( C2 and two-dimensional image I2 unrelated to three-dimensional data C1 are inputted to the three-dimensional data processor 1 from an outside device.

The three-dimensional data C1 and C2 and the two-dimensional images I1 and I2 are read via a storage medium drive device such as a floppy disk drive, which is one of the peripheral devices 15, when the data and images are stored in a storage medium such as a floppy disk. The read data are temporarily stored in the memory 12, or stored on the hard disk 11.

When the three-dimensional data C1 and C2 and the two-dimensional images I1 and I2 are stored in an external device outside the three-dimensional data processor 1, the appropriate data are read from a connected external device via an external device connector which is one of the peripherals 15, and the data are stored temporarily in the memory 12, or stored on the hard disk 11.

Figure 2:
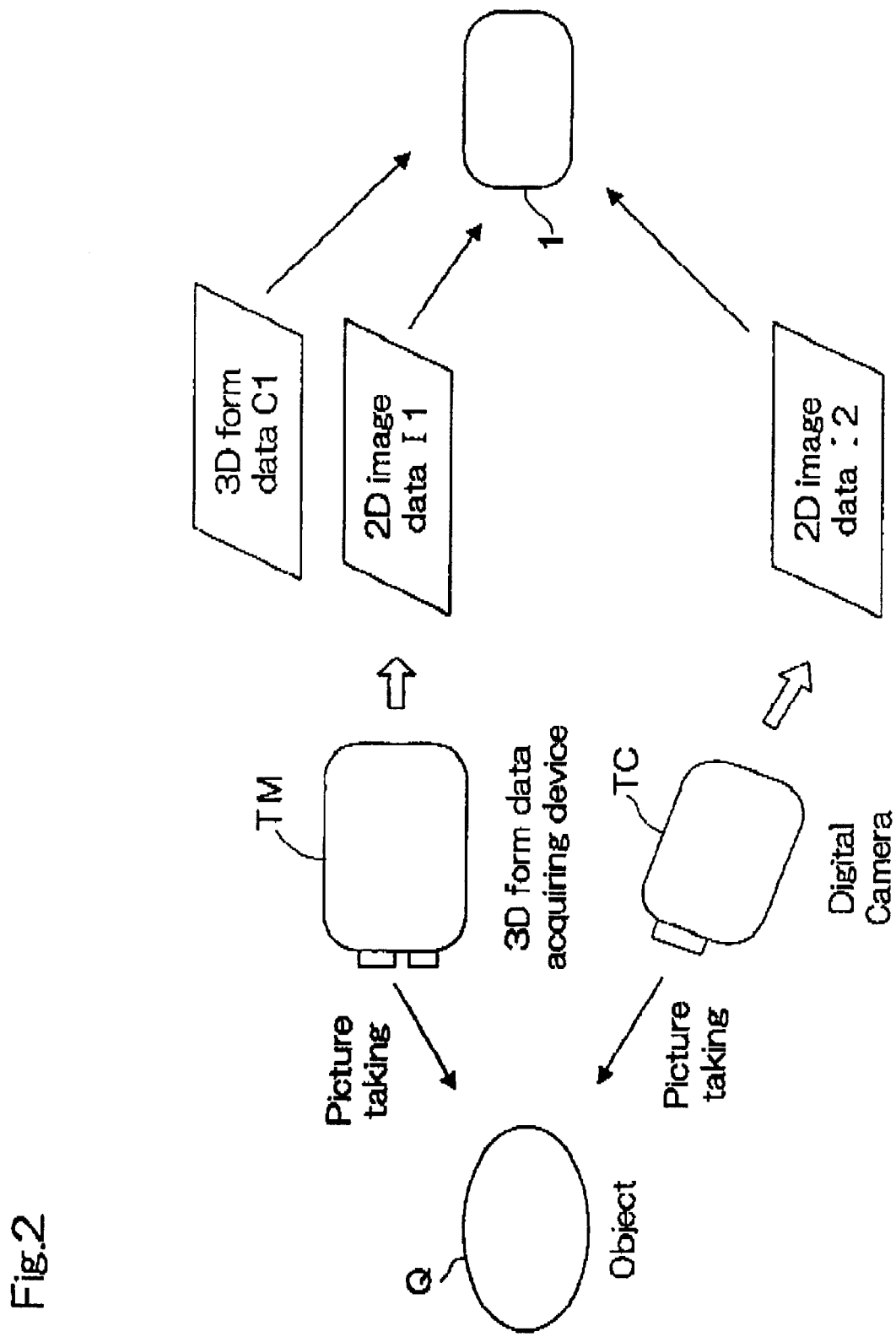
FIG. 2 illustrates the method of obtaining three-dimensional data and a two-dimensional image.
Figure 3:
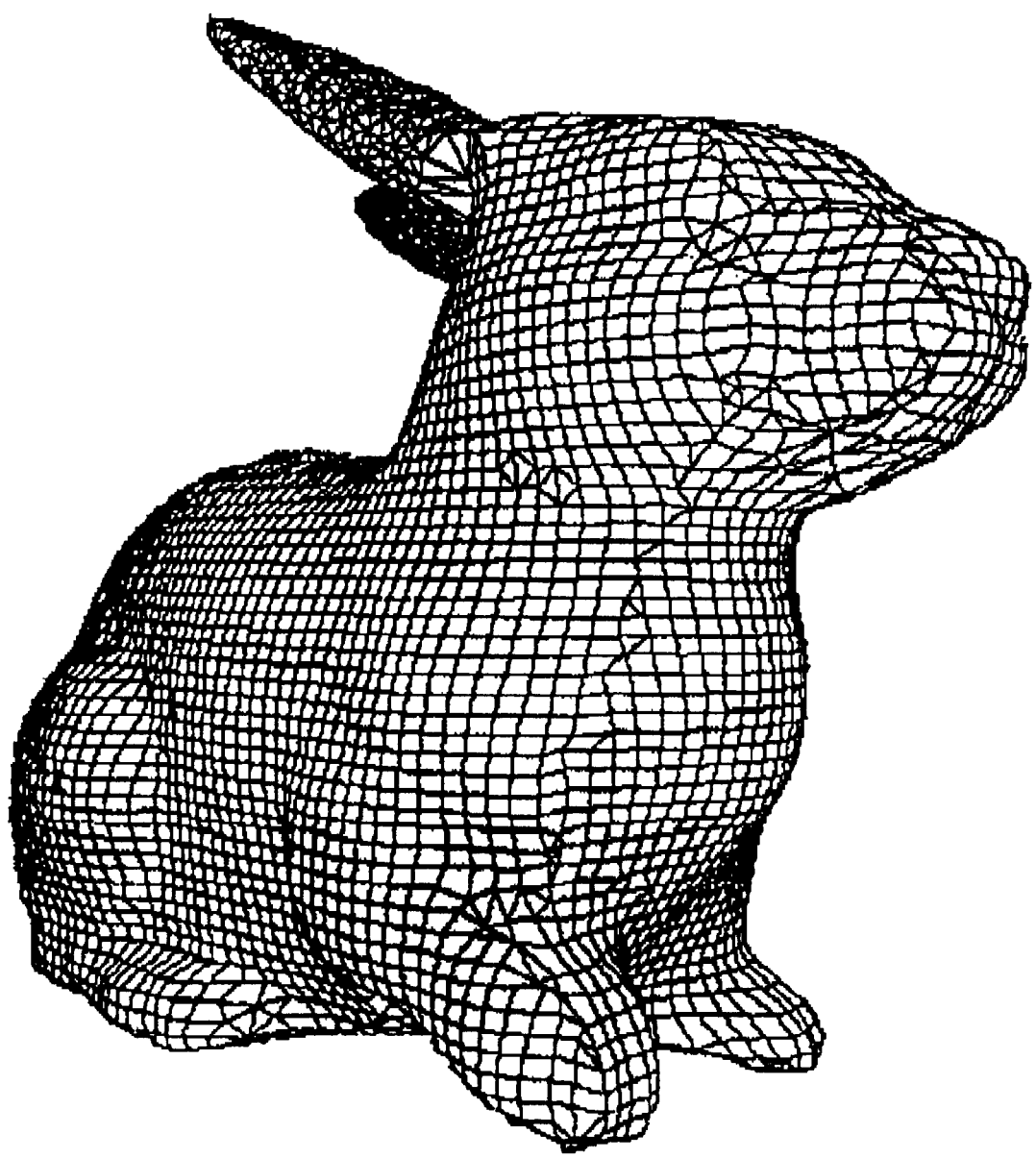
FIG. 3 shows an example of three-dimensional data.

FIG. 2 illustrates the method of obtaining the three-dimensional data C1 and C2 and the two-dimensional images I1 and I2. FIG. 3 shows an example of the three-dimensional data C1.

As shown in FIG. 2, first an object Q is sensed by the three-dimensional shape data acquiring device TM, and the three-dimensional data C1 are obtained. The light-section method is the most practical method to use as a method for recognizing a three-dimensional shape. The three-dimensional shape acquiring device TM using the light-section method is well known, and an example of such a device is described in detail in U.S. Pat. No. 5,668,631. A two-dimensional image I1 having the same field angle can be obtained at the same time as the three-dimensional data C1 of the object Q by the three-dimensional shape acquiring device TM. Since the mutual positional relationship parameters are known for the three-dimensional data C1 and the two-dimensional image I1, the correlation can be made automatically.

The correlation referred to in this specification is the determination of the two-dimensional image projection position corresponding to each position of the three-dimensional shape. That is, the relationship of the three-dimensional data C1 and the two-dimensional image I1 basically can be expressed by a projection matrix. The expression method using a projection matrix is described in detail in "Three-Dimensional Vision", (Kyoritsu Shuppan), and is briefly described below.

The projection from a point on the three-dimensional data to the two-dimensional image is expressed by equation (1) below.

$$s\tilde{m} = P\tilde{M} \quad (1)$$

Where the following relationships obtain.

$$\tilde{m} = [u, v, 1]^T \quad (2)$$

$$\tilde{M} = [X, Y, Z, 1]^T \quad (3)$$

$$P = \begin{bmatrix} P11 & P12 & P13 & P14 \\ P21 & P22 & P23 & P24 \\ P31 & P32 & P33 & P34 \end{bmatrix} \quad (4)$$

The s in equation (1) represents a coefficient, u and v in equation (2) represent coordinates of the image, and X, Y, Z in equation (3) represent the coordinates of points on the three-dimensional data. The P in equation (4) represents the projection matrix, and the value of the factors can be calculated when parameters such as the camera (three-dimensional shape acquiring device) focal length are known.

On the other hand, when the camera parameters are not known, a plurality of individual points on the two-dimensional image and corresponding points on the three-dimensional data are specified, and substituted in equation (1), and a P proximity matrix is determined by solving for P using the least squares method.

Next, the two-dimensional image I2 is obtained by sensing (photographing) the object Q using, for example, a general digital camera TC. The two-dimensional image I2 is not correlated to the three-dimensional data C1. The three-dimensional data C1 may be data generated by, for example, commercial computer graphic modeling software, or commercial three-dimensional shape modeling software and the like.

The three-dimensional data C1 and C2 normally are expressed as a polygon (polyhedron). The three-dimensional data C1 and C2 and the two-dimensional images I1 and I2 also may be expressed in a general data format such as JPEG file format, VRML format and the like. These data need not be input in their entirety.

The method of specifying correspondence points RP for mapping of the data and images is described below.

Figure 4:
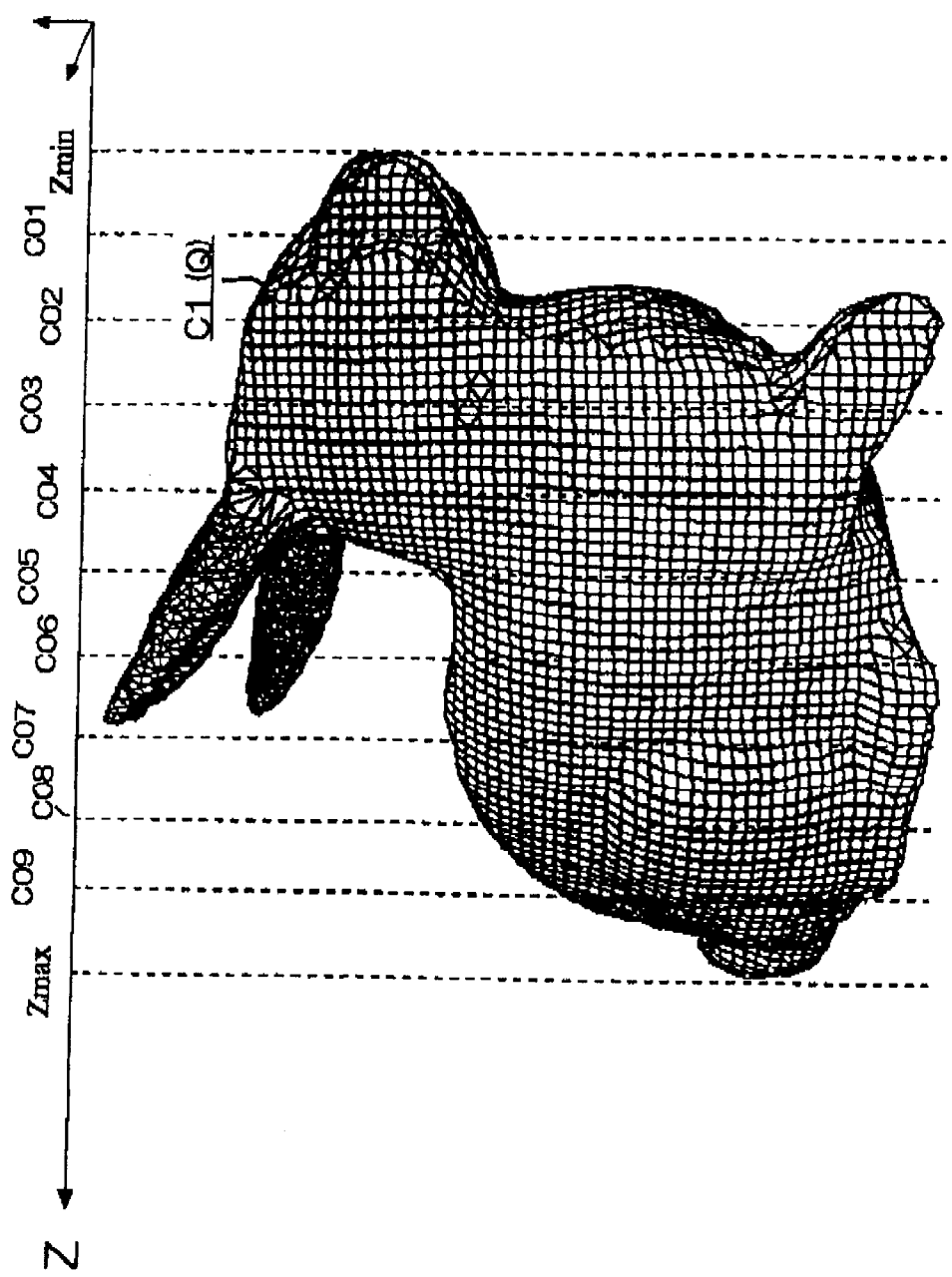
FIG. 4 shows the cross section positions across the three-dimensional data at equidistances.
Figure 5:
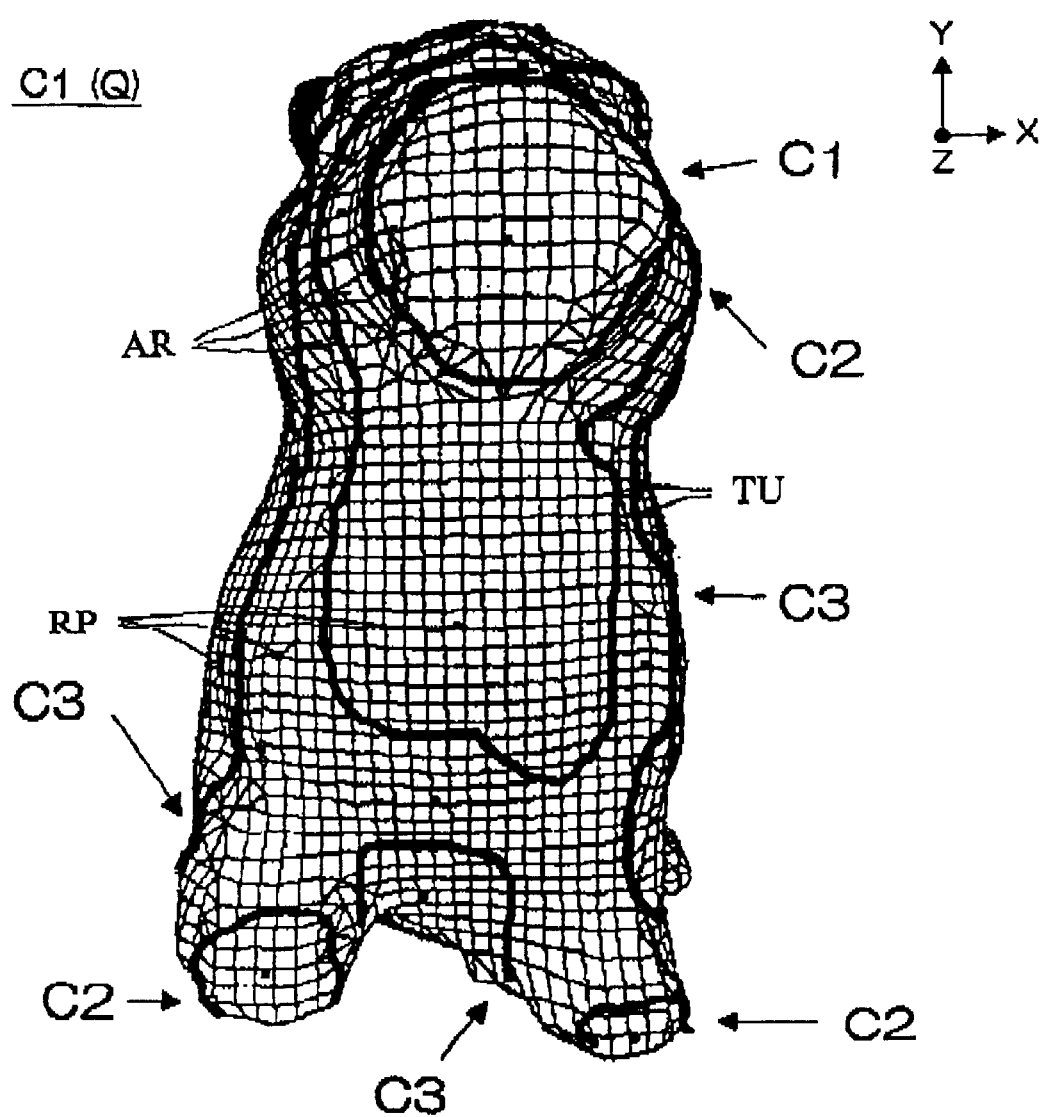
FIG. 5 shows a display with appended contour lines in the three-dimensional data.
Figure 6:
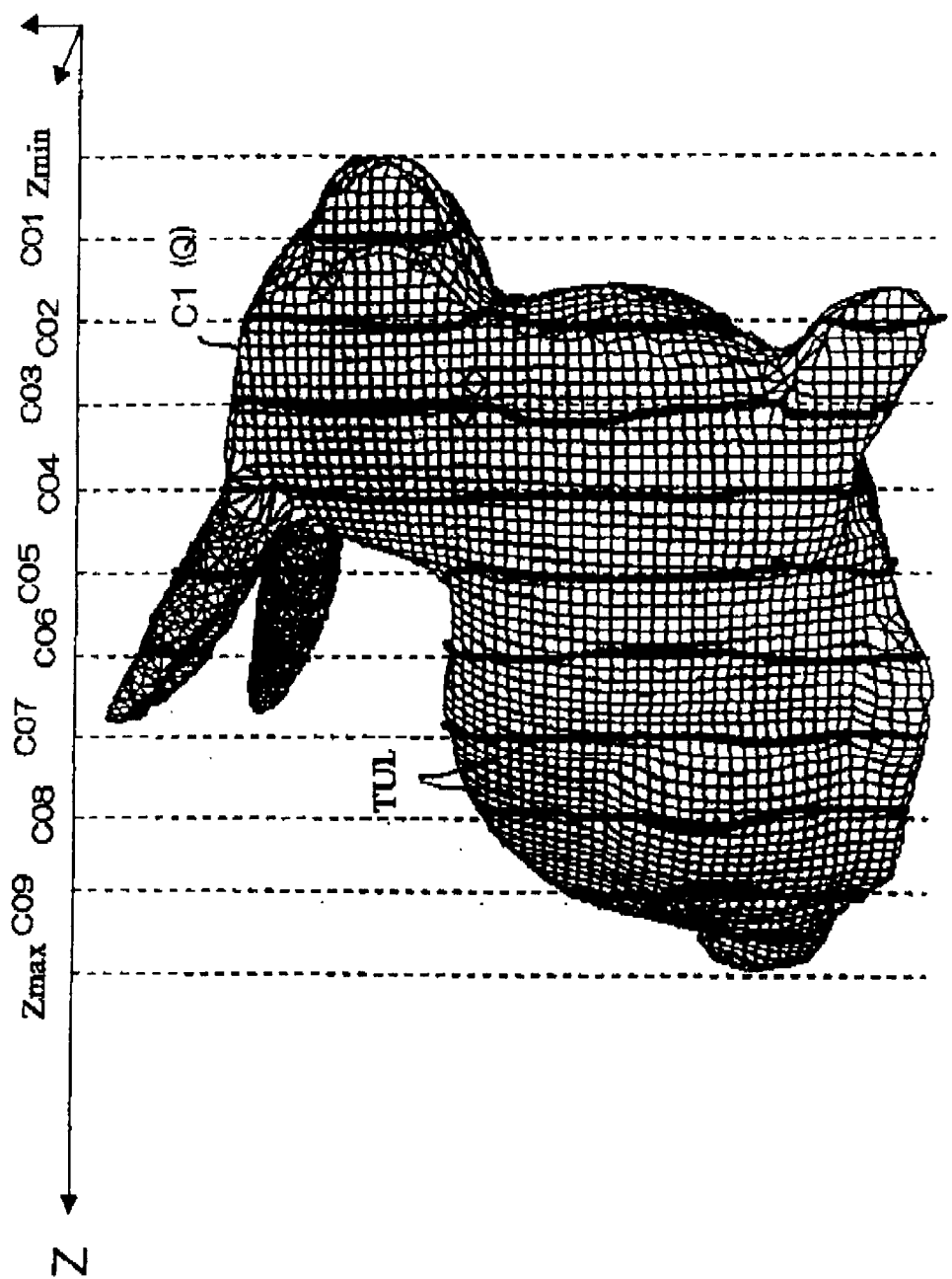
FIG. 6 shows the three-dimensional data and contour lines of FIG. 5 viewed from the side.
Figure 7:
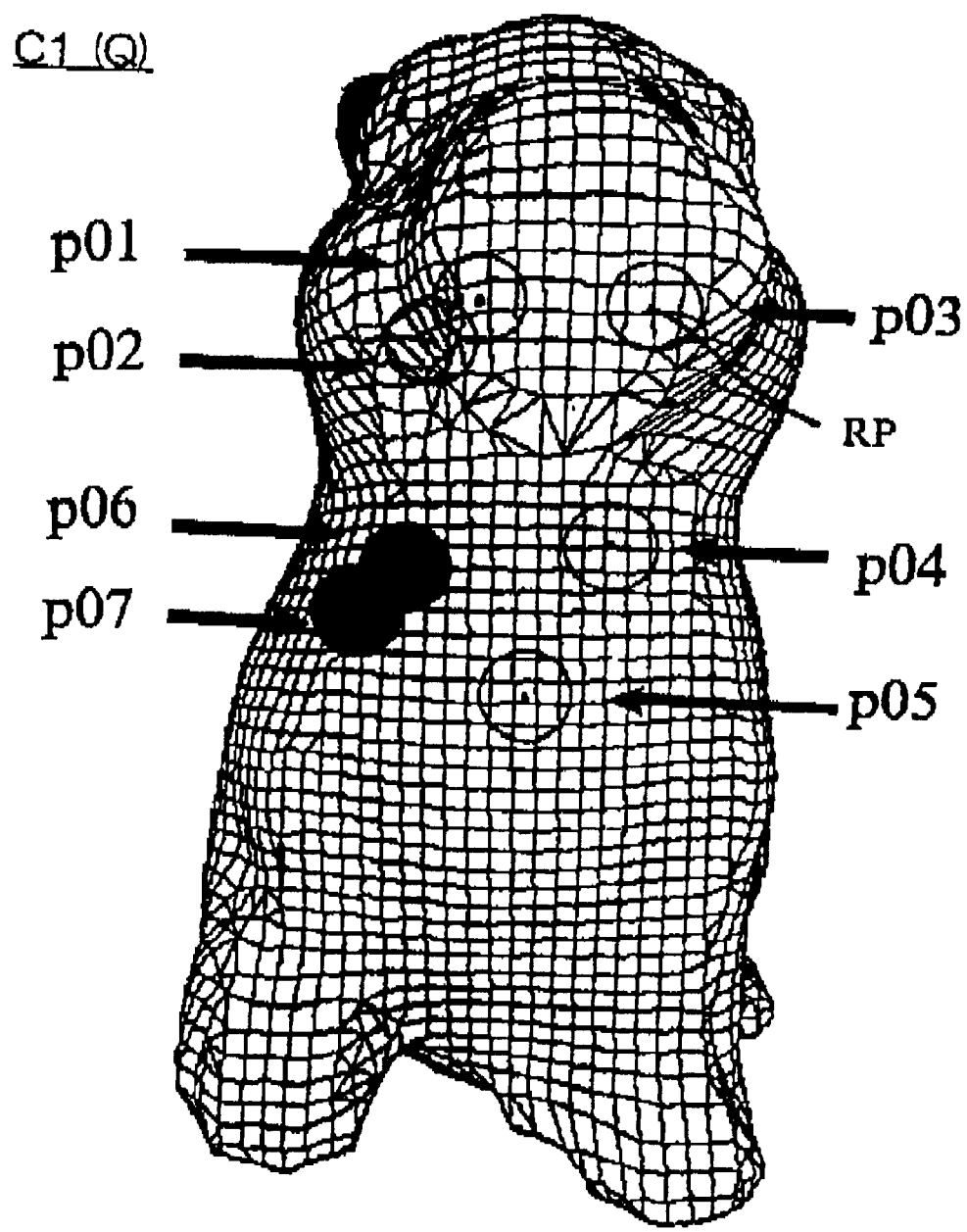
FIG. 7 shows fixed radius semitransparent spheres as the center of correspondence points displayed in the three-dimensional data.

FIG. 4 shows the position in cross section of three-dimensional data C1 at equidistance along the depth direction, and FIG. 5 shows the contour line TU connecting the positions at equidistance in the depth direction in the three-dimensional data C1. FIG. 6 shows the three-dimensional data C1 and contour line TU of FIG. 5 viewed from the side, and FIG. 7 shows fixed radius semitransparent spheres as the center of correspondence points RP displayed in the three-dimensional data C1.

In order to map the three-dimensional data C1 and the two-dimensional image I2, the projection matrix from the three-dimensional data C1 to the two-dimensional image I2 must be determined as described previously, and in this instance it is to be desired that the correspondence points are present on the three-dimensional data C1 uniformly so as to minimize projection error.

In the present embodiment, the three-dimensional data C1 are divided into a plurality of areas by spatial position in the depth direction, and the result is displayed on the display HG.

The three-dimensional data C1 shown in FIG. 3 was obtained by photographing the "rabbit" that is the object Q. In the present embodiment, the mapping on the three-dimensional data C1 is described viewing the "rabbit" from the front as shown in FIG. 5. Accordingly, in FIG. 5, the lateral direction is the X direction, the vertical direction is the Y direction, and the depth direction is the Z direction. In FIG. 4, the lateral direction is the Z direction, and the right edge is the point of minimum value of the Z coordinate, whereas the left edge is the point of maximum value of the Z coordinate.

As shown in FIG. 4, the object Q is hypothetically sectioned at fixed spacing in the section positions C01–C09 in the Z direction. The outline of the section positions C01–C09 is displayed appended to the three-dimensional data C1 of FIG. 5. As shown in FIG. 5, the outline of the section positions C0–C09 is shown as contour line TU.

In FIG. 5, the outline of the section positions C07–C09 is concealed by the three-dimensional data C1 from the line of sight direction in the drawing, and is not displayed via hidden line masking. The outline at section positions C04 and C05 is omitted to avoid complicating the diagram. the mutually different areas AR are displayed with mutually different patterns, colors, or densities.

According to FIG. 5, it is readily apparent to a user that the area AR circumscribed by the contour line TU is within the same range in the depth direction even if the spacing becomes wider or narrower. A user can specify correspondence points RP evenly using the contour line TU as a yardstick by using the contour line TU as a guide marker of the positions of the correspondence points RP in the depth direction.

For example, within one area AR circumscribed by the contour line TU, only a single correspondence point RP is specified in the depth direction (Z direction), and correspondence points RP are uniformly specified in the breadth directions (X and Y directions). The correspondence points RP can be specified evenly in the depth direction by specifying only a single correspondence point RP in the depth direction within a single area AR, thereby achieving uniformity of specification in the depth direction. Furthermore, since a user can readily verify visually whether or not there is uniformity in the breadth directions, the user can ultimately specify correspondence points RP uniformly and easily within the area AR.

Overall, correspondence points RP can be easily and uniformly specified between different areas AR by specifying only a single correspondence point RF for both narrow areas and wide areas. Unique points on the three-dimensional data C1, e.g., eyes, nose, mouth, ears, may be specified by special correspondence points so as to avoid obstructing the aforesaid correspondence points RP.

FIG. 6 shows the three-dimensional data C1 and the contour line TU of FIG. 5 displayed rotated 90 degrees. The contour line TU shown in FIG. 5 is displayed as line TUL in FIG. 6.

In the example shown in FIG. 7, when the correspondence points RP are specified, fixed semitransparent spheres P01–P07 are displayed as the center of the corresponding correspondence points RP. When the spheres P mutually intersect three-dimensionally, the spheres P are displayed enhanced so as to have different colors or patterns, or a buzzer alarm sounds an alert. For example, Spheres P06 and P07 intersect and are displayed in different colors. In this way, the user is alerted when specified correspondence points RP are mutually nearer than a predetermined distance. The user may move the correspondent point RP to another position when so alerted. Alternatively, the user may leave the correspondence point RP as is.

The spheres P01 and P02 appear to intersect when the "rabbit" is viewed from the front, but these spheres are separated in the depth direction and do not actually intersect. In this way, a user can readily distinguish the situation by changing the colors of the intersecting spheres P. Furthermore, the three-dimensional data C1 are not hidden since the spheres P are displayed in semi transparency. The radius of the sphere P may be set by the user, or a preset value may be used.

Although not shown in the drawing, a warning may be issued without displaying sphere P when a correspondence point RP has been specified and the distance between that correspondence point RP and a previously specified correspondence point RP is calculated and the obtained distance is less than a value set beforehand.

The methods of mapping the three-dimensional data C1 and the two-dimensional image I1 when these data are the object of mapping are described below with reference to the flow chart.

[Mapping other three-dimensional data or a two-dimensional image to three-dimensional data]

First, the case of mapping three-dimensional data C1 by other three-dimensional data C2 or a two-dimensional image I2 is described.

Methods of mapping the other three-dimensional data C2 to the three-dimensional data C1 sometimes use modeling via a model base. Modeling via a model base is a method of modifying three-dimensional model data (three-dimensional data C2) to match the three-dimensional shape data (three-dimensional data C2), and is realized by moving the specified points on the three-dimensional model data to the specified points on the three-dimensional shape data.

Mapping the three-dimensional data C1 and the three-dimensional data C2 is accomplished by specifying in a plurality of pairs of the correspondence points which are the points of mutual correspondence between the two data sets. The correspondence points on the three-dimensional data C2 are moved to the correspondence points on the three-dimensional data C1. The amount of movement of the points other than the correspondence points on the three-dimensional data C1 is determined by interpolation from the amount of movement of the correspondence points present in proximity to the point.

Since the amount of movement of the majority of points, i.e., the position after modification, is determined by interpolation in modeling via a model base, an excellent result is obtained of correspondence points evenly present on the three-dimensional data.

The method of mapping three-dimensional data C1 by uncorrelated two-dimensional image I2 may be used, for example, when a two-dimensional image I1 mapped to the three-dimensional data C1 is replaced by the two-dimensional image I2. Furthermore, the method may be used when a mapped two-dimensional image I1 is absent, and a two-dimensional image I2 is to be correlated to the three-dimensional data C1.

Figure 8:
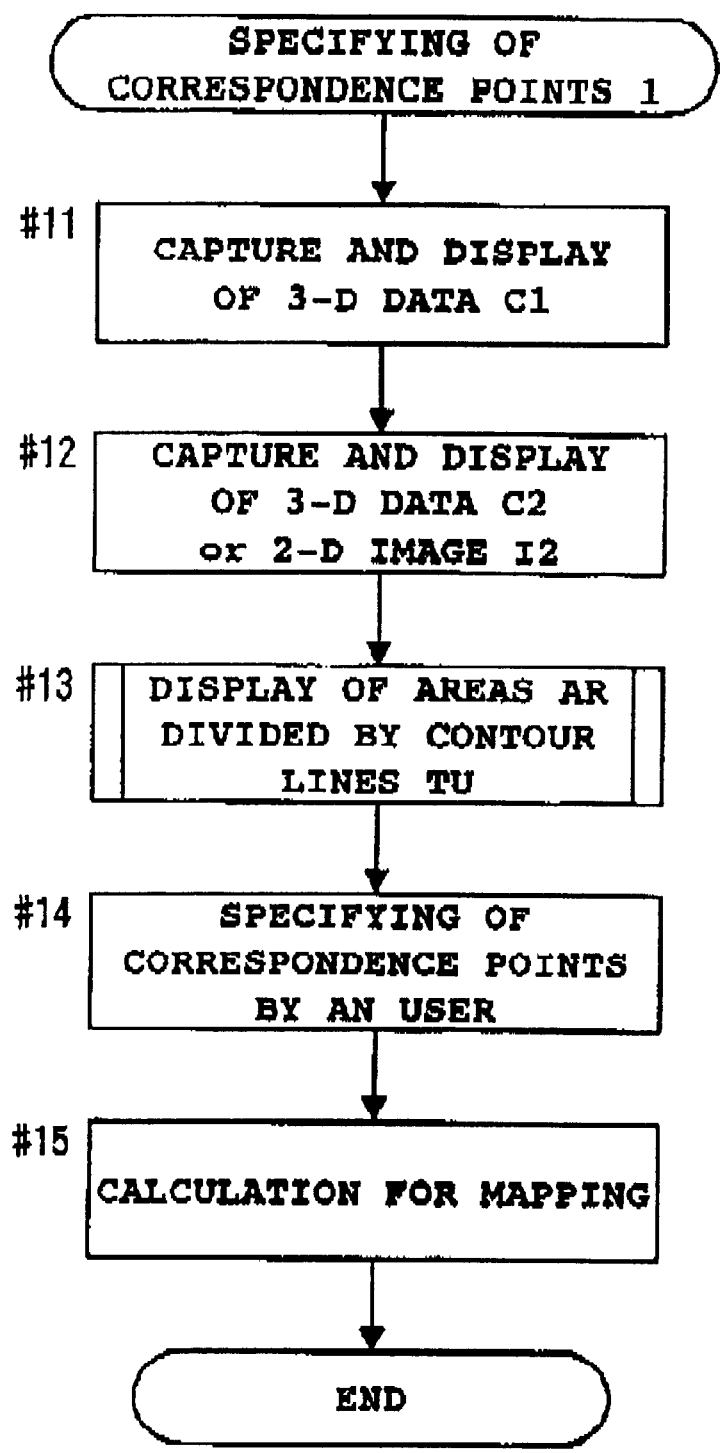
FIG. 8 is a flow chart showing the sequence in a first correspondence point specification method.
Figure 9:
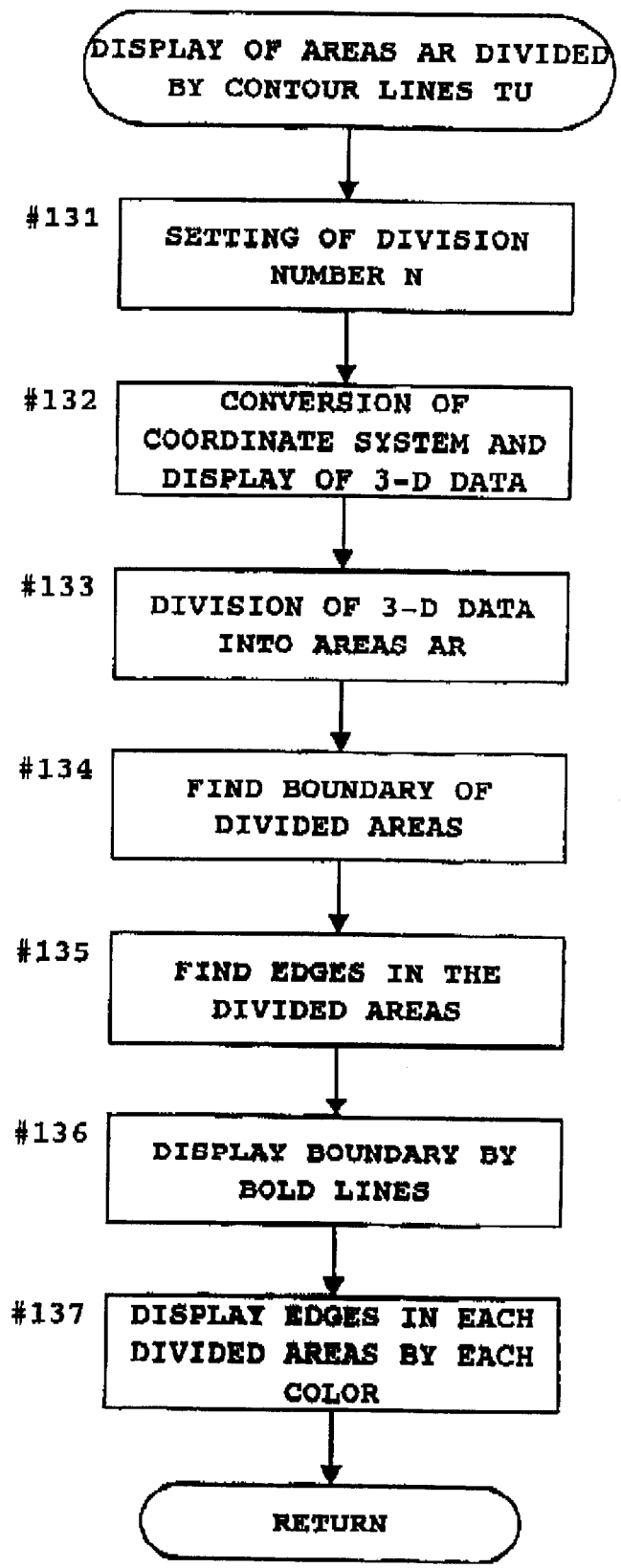
FIG. 9 is a flow chart showing the three-dimensional division area display process of FIG. 8.

FIG. 8 is a flow chart showing the sequence in a first correspondence point specification method, and FIG. 9 is a flow chart showing the three-dimensional division area display process of FIG. 8.

In FIG. 8, the three-dimensional data C1 is captured, and displayed on the display surface of the display 13 (#11). Then, the three-dimensional data C2 and the two-dimensional image I2 are captured and displayed on different areas of the display surface of the display 13 (#12).

The three-dimensional data C1 are divided in specification areas in the depth direction, and the outline of the divided areas are displayed as contour line TU (#13). At this time, the display attributes change for each area AR circumscribed by two contour lines TU. Thereafter, the user uses the contour line TU as a guide marker of the position of the correspondence point RP in the depth direction to specify the correspondence point RP (#14). At this time, a message may be displayed to prompt the user to specify a correspondence point RP. The three-dimensional data C1 and the three-dimensional data C2 or the two-dimensional image I2 are mapped using the specified correspondence points RP (#15).

In FIG. 9, first the division number N is set for the divisions in the depth direction (#131). The division number N may be set by the user, or may be a predetermined value. Then, the three-dimensional data C1 are displayed by a coordinate system with the depth direction being the Z-axis (#132). For this reason, the coordinate system of the three-dimensional data C1 is converted using line of sight information (camera information). The line of sight information generally includes the three-dimensional data C1, but predetermined line of sight information may be used when line of sight information is not available.

The method of coordinate conversion of each point on the three-dimensional data C1 is described below. The method of expression differs depending on the format of the line of sight information.

That is, The calculations shown in equation (5) below are performed to convert the three-dimensional data C1 $(x, y, z)^t$ to the three-dimensional data C1a $(X, Y, Z)^t$ expressed by a coordinate system having the depth direction as the Z-axis.

$$\begin{pmatrix} X \\ Y \\ Z \end{pmatrix} = \begin{pmatrix} A00 & A01 & A02 & A03 \\ A10 & A11 & A12 & A13 \\ A20 & A21 & A22 & A23 \end{pmatrix} \begin{pmatrix} x \\ y \\ z \\ 1 \end{pmatrix} \quad (5)$$

In equation (5), the left side is the coordinate value of the three-dimensional data C1a $(X, Y, Z)^t$, and the second element on the right side is the coordinate value three-dimensional data C1 $(x, y, z)^t$. The first element on the right side is the conversion matrix determined from the line of sight information.

Returning now to FIG. 9, the maximum value and minimum value of the Z coordinate values are determined for all peaks of the converted three-dimensional data C1a, and the area between these maximum and minimum values is divided into N areas (#133). Therefore, the three-dimensional data Ca1 are sectioned in a plane perpendicular to the Z-coordinate axis as shown below.

$$Z = \frac{(Z\max - Z\min)}{N} \times k + Z\min \quad (6)$$

Where k=1, 2, 3, . . . N−1. In this way, the areas are divided into N areas by equation (7).

$$Z \subset \left[ \frac{(Z\max - Z\min)}{N} \times (k-1) + Z\min, \frac{(Z\max - Z\min)}{N} \times k + Z\min \right] \quad (7)$$

Where K=1, 2, 3, . . . N.

Zmax represents the maximum Z coordinate value and Zmin represents the minimum Z coordinate value among all peaks of the three-dimensional data C1a after coordinate conversion.

Then, the cross section outline is determined in each division plane of the three-dimensional data C1a to plainly state the boundary of the N number of division areas (#134). Since the three-dimensional data C1a are expressed as a polygon, specifically the intersections of the division plane and each triangular edge forming the polygon are determined, and the outline shape is determined by sequentially connecting these intersections. This outline shape generally becomes the outline enclosing a plurality of areas. The intersections are determined as follows.

The division plane $Z=Z_0$ and two points $(p1^x, P1^y, P1^z)$ and $(P2^x, P2^y, P2^z)$ have relative intersection when $0 \leq \alpha \leq 1$ (where, $\alpha=(Z_0-P2x)/(P1x-P2^x)$), and the coordinate value of the intersection is below.

$$(\alpha(P1^x-P2^x)+P2^x, \alpha(P1^y-P2^y)+P2y, Z_0$$

When $\alpha<0$ or $1<\alpha$, an intersection does not exist.

Although described as a polygonal expression via triangular shape, generally similar calculation can be made in the case of convex polygon using polygonal expression.

All edges of the polygon entering each division area of equation (7) are determined for the three-dimensional data C1a after coordinate conversion. This allows simple determination of the inclusive relationship of edge endpoints and areas of equation (7). When an edge straddles a plurality of areas, the intersections with the cross section plane expressed by equation (6) are determined, and the edge at this intersection is divided into a plurality of edges (hereinafter referred to as "partial edge"), and a check is made to determine whether or not each partial edge enters the division area (#135).

The cross section outline of the thus obtained data is displayed by a bold line on the display surface (#136), and the edges entering each division area are displayed as a color allocated to that division area (#137). Differences of the three-dimensional data C1 (three-dimensional data C1a) in the depth direction are well-defined by this type of display.

The instance of displaying sphere P as shown in FIG. 7 is described below.

Figure 10:
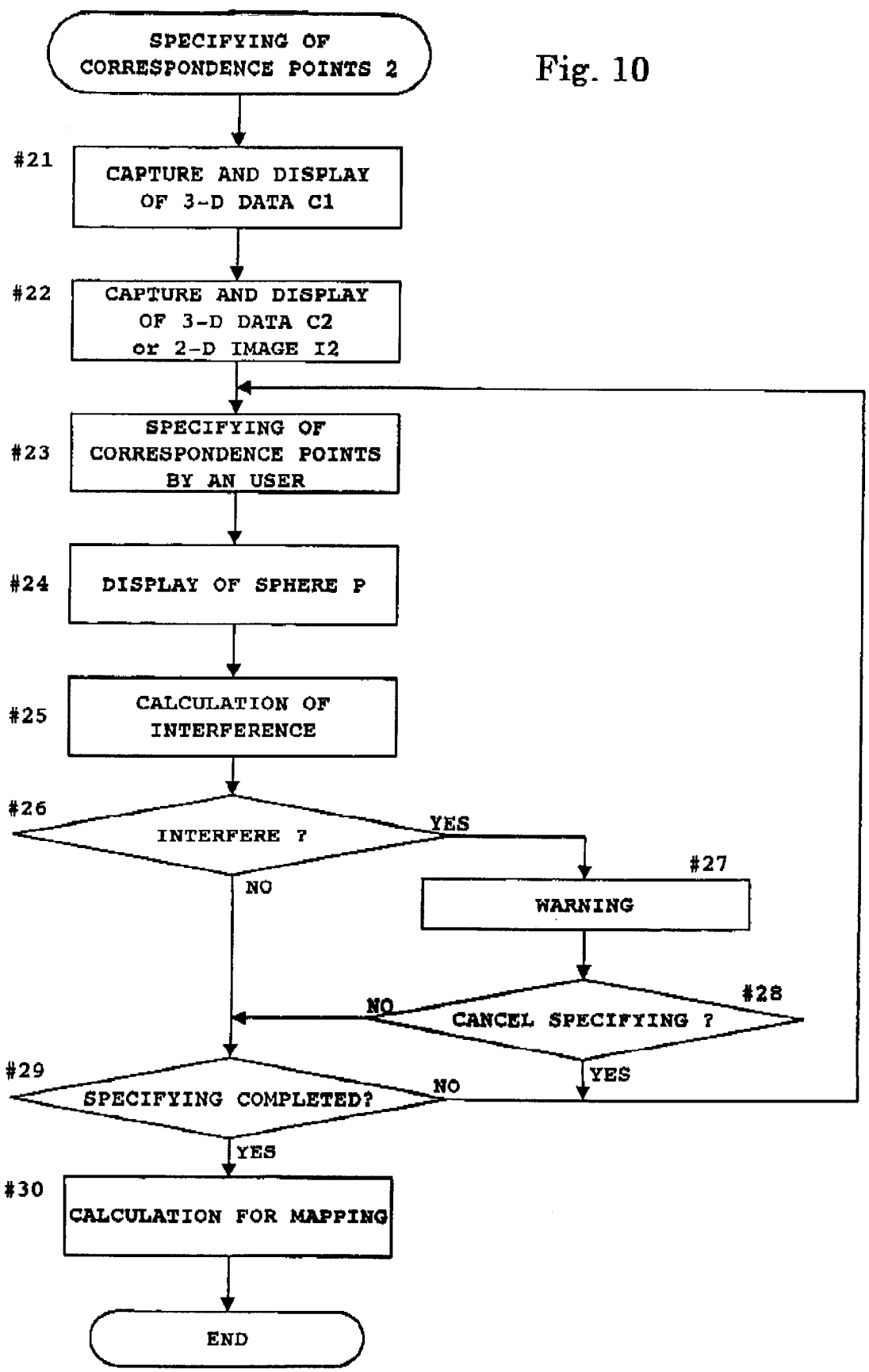
FIG. 10 is a flow chart showing the sequence in a second correspondence point specification method.

FIG. 10 is a flow chart showing the sequence in a second correspondence point specification method.

Steps #21, #22, #30 in FIG. 10 are identical to steps #11, #12, #15 in FIG. 8. The processes of steps #23–29 of the current method are substituted for the processes of steps #13 and #14.

In step #23, the correspondence points RP are specified while viewing the input data on the display surface (#23). Fixed radius semitransparent spheres P are display for the specified correspondence points RP (#24). A check is made to determine whether or not a sphere P interferes with a previously displayed sphere P (#25). The calculation for determining whether or not two spheres P interfere is accomplished as described below.

The spheres P of radius R at the center of two points $(p1^x, P1^y, P1^z)$ and $(P2^x, P2^y, P2^z)$ intersect when the following statement obtains.

$$(P1^x-P2^x)^2+(P1^y-P2^y)^2+(P1^z-P2^z)^2<(2 \times R)^2$$

When there is interference (#26: YES), a warning message is displayed. When the color of all spheres P change due to interference (#27). Since the user may decide to specify a point as a correspondence point RP even when two correspondence points RP are in proximity, a determination is made in step #28 as to whether or not to cancel an interfering correspondence point RP.

On the other hand, when it is determined that a sphere P does not interfere, the processes of step #23 and subsequent steps are repeated until the user decides to end the specification of the correspondence points RP.

[Mapping using a two-dimensional image mapped to three-dimensional data]

Mapping other three-dimensional data C2 or two-dimensional image I2 to three-dimensional data C1 using the two-dimensional image I1 mapped to the three-dimensional data C1 is described below.

Figure 11:
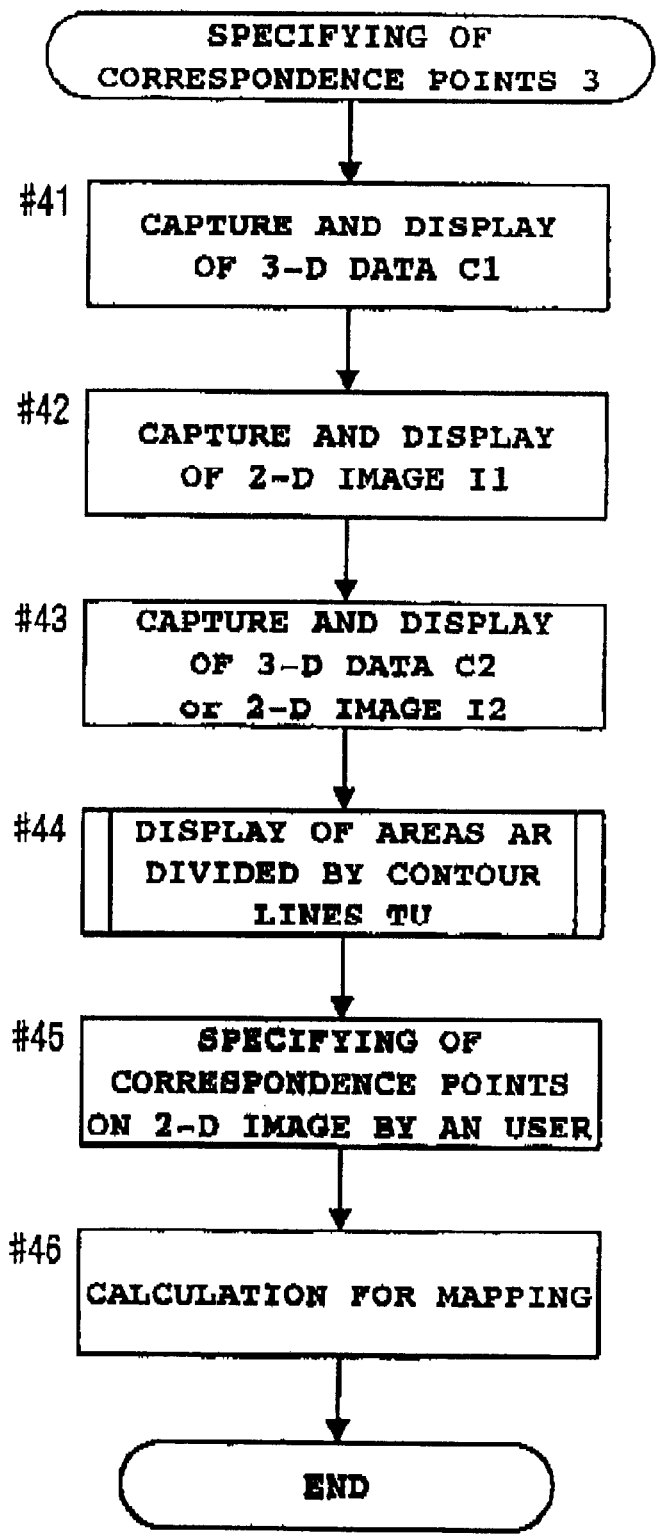
FIG. 11 is a flow chart showing the sequence in a third correspondence point specification method.
Figure 12:
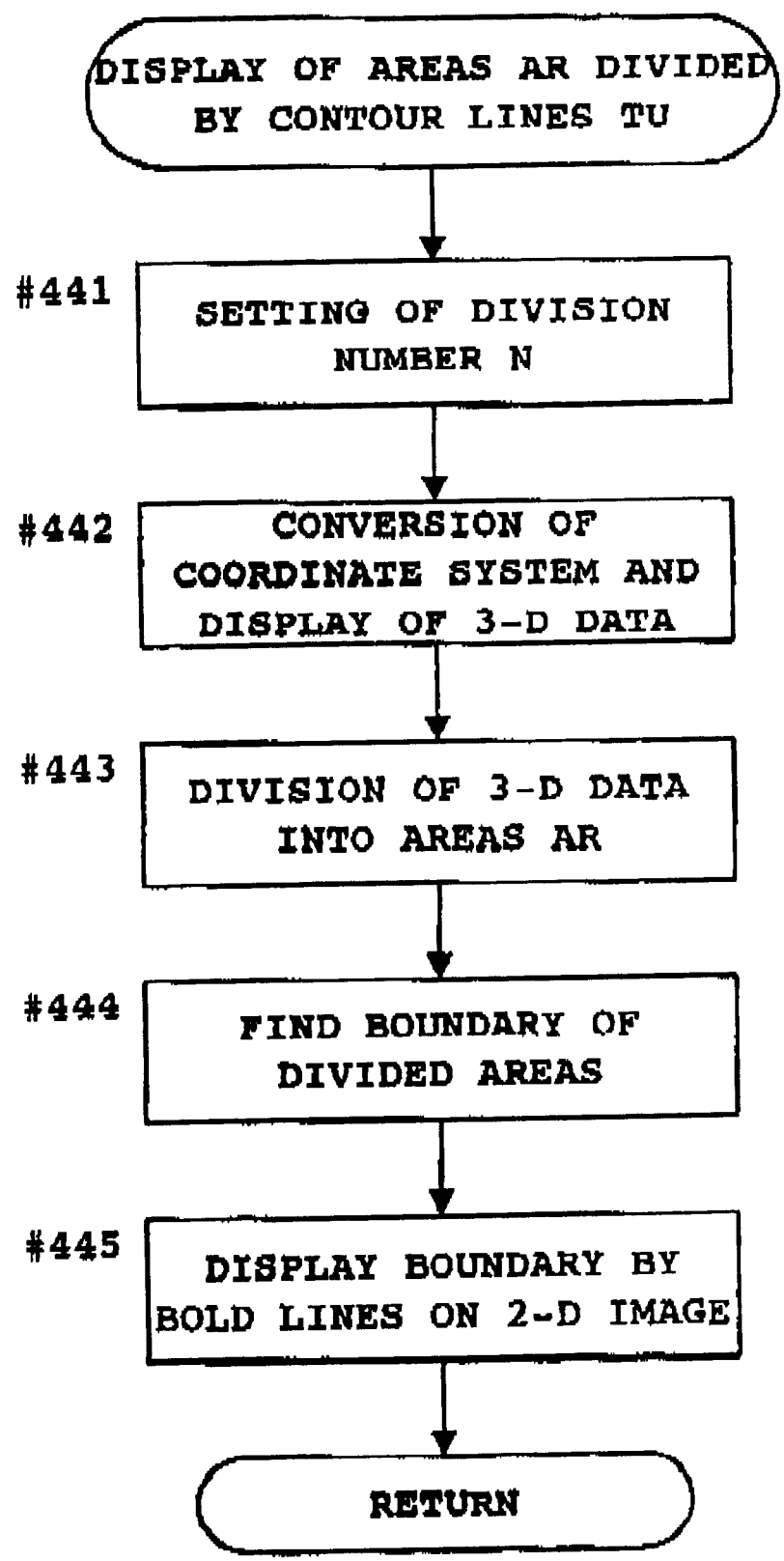
FIG. 12 is a flow chart showing the two-dimensional division area display process of FIG. 11.

FIG. 11 is a flow chart showing the sequence in a third correspondence point specification method, and FIG. 12 is a flow chart showing the two-dimensional division area display process in FIG. 11.

Since the two-dimensional image I1 is a known projection surface, the projection matrix from the three-dimensional data C1 to the two-dimensional image I1 is already known. In this case, the user can understand and specify the correspondence points RP relative to the two-dimensional image I1 even more readily than specifying the correspondence points RP relative to the three-dimensional data C1. Accordingly, the two-dimensional image I1 is displayed on the display surface, and the contour line TU of the three-dimensional data C1 is displayed in the two-dimensional image I1.

Steps #41 and #43 in FIG. 11 are identical to steps #11 and #12 in FIG. 8. In step #42, the two-dimensional image I1 is captured and displayed in the areas different from the areas of the three-dimensional data C1 on the display surface of the display 13. In step #44, the three-dimensional data C1 are divided into areas in the depth direction, and displayed.

In step #45, the correspondence points RP are specified on the two-dimensional image I1. Since the pattern of the surface of the object Q is well expressed in the two-dimensional image I1, the correspondence points RP are easily specified.

In step #46, the three-dimensional data C1 and three-dimensional data C2 or two-dimensional image I2 are mapped using the specified correspondence points RP. Since the correspondence points RP specified indirectly in the two-dimensional image I1, the correspondence points RP on the three-dimensional data C1 corresponding to the specified points on the two-dimensional image I1 must be determined. As previously described, this is determined by using a projection matrix from each peak on the three-dimensional data C1. In this process, several peaks are selected near the specified points on the two-dimensional image I1, the three-dimensional data C1 between these points are finely divided, and the projection points are determined on the two-dimensional image I1 of these division points. This process is repeated a number of times, and when the projection position is sufficiently near the specified point, the point on the three-dimensional data C1 projected at the specified point is designated the correspondence point RP.

Steps #441–444 in FIG. 12 are identical to steps #131–134 in FIG. 9. In step #445, the cross section outline of each area is projected on the two-dimensional image I1 using a known projection matrix, and each projected outline is displayed as a bold line or in a special color.

Although the methods of specifying the correspondence points RP relative to the three-dimensional data C1 have formed the core of the description in the previously described embodiments, the contour line TU or sphere P may be similarly displayed for the three-dimensional data C1 so as to thereby readily specify the correspondence points RP in the three-dimensional data C2.

The areas AR for which correspondence points RP are obtained may be indicated in display or deleted from display in the previously described embodiments. the structure of the three-dimensional data processor 1, process content or sequence may be suitably modified insofar as such modification does not depart from the scope of the present invention.

According the aforesaid methods, correspondence points easily and evenly specified when mapping a three-dimensional shape.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A method for mutually mapping first three-dimensional shape data to second three-dimensional shape data or a two-dimensional image, comprising the steps of:

displaying a first shape based on the three-dimensional shape data;

within said displayed data, displaying indicator that correspond to a depth direction of the shape, wherein a position of the displayed indicator functions as guide marker of a correspondence point position relative said indicator position along the depth direction; and accepting specifying of a position of the correspondence point by an user.

2. A method according to claim 1, wherein said indicator is a contour line concerning the depth direction.

3. A method according to claim 2, wherein said indicator is displayed as a bold line.

4. A method according to claim 1, wherein said indicator is areas divided by contour lines concerning the depth direction, and each area is displayed by different color.

5. A method according to claim 1, at least two indicators are displayed, and each area between the indicators is displayed via mutually different display manners.

6. A computer program product for prosecuting the method of claim 1 by a data processor including a CPU.

7. A method for mutually mapping a first three-dimensional shape data to a second three-dimensional shape data or a two-dimensional image, comprising the steps of:

displaying a first two-dimensional image mapped to a first three-dimensional shape data;

displaying indicator relating to the depth direction of the first three-dimensional shape data within the displayed first two-dimensional image, so as to use the indicator as guide markers of the position of a correspondence point along a depth direction; and accepting specifying of a position of the correspondence point by an user.

8. A method according to claim 7, wherein said indicator is a contour line concerning the depth direction.

9. A method according to claim 8, wherein said indicator is displayed as a bold line.

10. A method according to claim 7, wherein said indicator is areas divided by contour lines concerning the depth direction, and each area is displayed by different color.

11. A method according to claim 7, at least two indicators are displayed, and each area between the indicators is displayed via mutually different display manners.

12. A computer program product for prosecuting the method of claim 7 by a data processor including a CPU.

13. A method for mutually mapping a first three-dimensional shape data to a second three-dimensional shape data or a two-dimensional image, comprising the steps of:
   displaying a shape based on the first three-dimensional shape data;
   accepting specifying and inputting of a positions of the correspondence points by an user;
   determining the distance between the inputted correspondence points; and
   issuing a warning when the determined distance is less than a predetermined value.

14. A method according to claim 13 further comprising a step of displaying a sphere around the position of each inputted point and the warning is achieved by the display manner of the sphere.

15. A computer program product for prosecuting the method of claim 13 by a data processor including a CPU.

16. A method for mutually mapping a first three-dimensional shape data to a second three-dimensional shape data or a two-dimensional image, comprising the steps of:
   displaying a shape based on the first three-dimensional shape data;
   accepting specifying and inputting of a positions of the correspondence points by an user; and
   displaying semitransparent spheres of a certain radius as the center of those correspondence points, so as to use these spheres as guide markers of the density of the correspondence points.

17. A method according to claim 16 further comprising a step of determining whether or not the spheres interfere with each other in a space corresponding to the first three-dimensional shape.

18. A method according to claim 17 further comprising a step of warning when the spheres interfere with each other.

19. A method according to claim 18, wherein the warning is achieved by altering the display manner of the spheres.

20. A computer program product for prosecuting the method of claim 16 by a data processor including a CPU.

* * * * *